Nov. 28, 1961 L. A. CLARKE ET AL 3,010,813
HYDROCARBON CONVERSION PROCESS
Filed Feb. 13, 1959
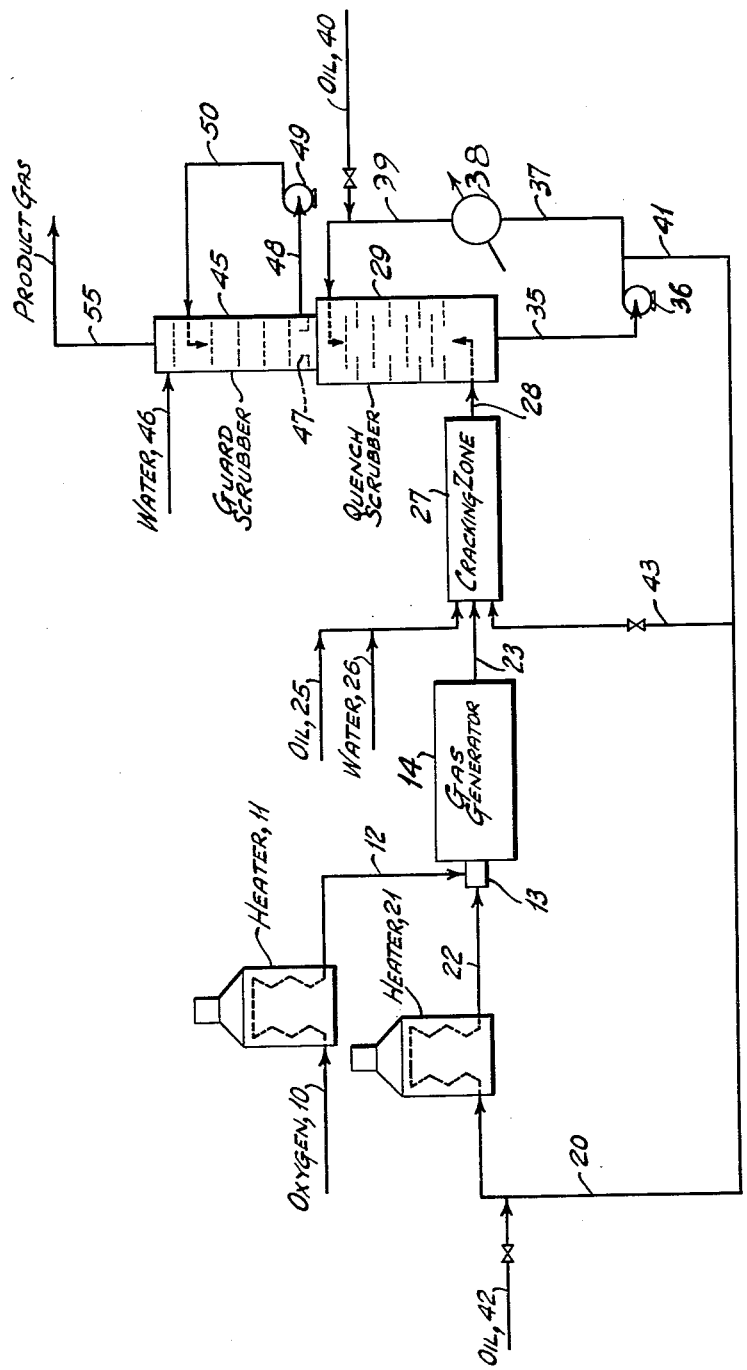

3,010,813
HYDROCARBON CONVERSION PROCESS

Louis A. Clarke, Fishkill, Clifford G. Ludeman, Scarsdale, and Harold V. Atwell, Wappingers Falls, N.Y., assignors to Texaco Inc., a corporation of Delaware
Filed Feb. 13, 1959, Ser. No. 793,037
5 Claims. (Cl. 48—215)

This invention relates to a method and apparatus for the conversion of carbonaceous fuels to gaseous products comprising carbon monoxide and hydrogen. In one of its more specific aspects it is directed to a process wherein a carbonaceous fuel is reacted in a gas generation zone with oxygen to produce a hot gaseous mixture comprising carbon monoxide, hydrogen, and entrained carbonaceous solids, and said hot gaseous mixture is cooled and scrubbed by contacting with a mixture comprising liquid hydrocarbon and water. In an embodiment of the process of this invention, a liquid hydrocarbon is cracked by contacting with the hot gaseous mixture produced by partial oxidation, and the products of such contacting are quenched and scrubbed with a mixture comprising hydrocarbon and water maintained in liquid state to produce gaseous products of high heating value. Advantageously, a portion of the scrubbing liquid containing liquids and solids separated from the gas products is passed to the aforesaid gas generation zone to comprise both carbonaceous fuel and water reacted therein.

In the partial oxidation of carbonaceous fuels, for example, gaseous and liquid hydrocarbons, coal, coke, oil shale and the like, the fuel is reacted with air, oxygen enriched air or substantially pure oxygen to produce carbon monoxide and hydrogen. Reaction is effected in a close compact reaction zone at an autogenous temperature within the range of about 1800 to 3500° F., preferably about 2200 to 2800° F. Preheating the reactants is generally desirable. The reaction zone is free from packing and catalyst and has nearly minimum internal surface. The reaction zone is maintained at a superatmospheric pressure preferably within the range of about 100 to 600 pounds per square inch gauge. Process water in the form of steam or water vapor is introduced into the reaction zone with the fuel and oxygen. In this system the steam is an overall endothermic reactant, assists in the dispersion of the fuel into the reactor, assists in control of the reaction temperature and increases the relative amount of hydrogen produced. The hot gaseous products comprise carbon monoxide and hydrogen with relatively small amounts of water vapor, carbon dioxide and other gases. A small amount of very fine carbon particles appears in the hot gaseous products as entrained solids.

The entrained solids must be removed from the partial oxidation products prior to use for further processing. The entrained solids may be removed by cooling the gas to a temperature within the range of about 150 to 450° F. and scrubbing with water whereby the solids are separated from the gases and suspended in the scrubbing water. Unfortunately, when the scrubbing water has suspended about 1 percent of carbon by weight from partial oxidation, a pasty mixture is formed. When the amount of this carbon in water reaches about 2.0 percent, the mixture becomes unpumpable. It has been found that oils, for example kerosine, gas oils and fuel oils, can suspend much higher concentrations of partial oxidation carbon without becoming excessively viscous or unpumpable. For example, pumpable mixtures of bunker fuel oil and partial oxidation carbon may contain in excess of 15.0 weight percent carbon. Cooling of the partial oxidation products from generator temperature to a suitable scrubbing temperature is desirably effected at least in part by direct contact with the scrubbing liquid. In the cooling of the hot partial oxidation product, considerable fluctuation may occur in the gas temperature and localized high temperatures resulting from uneven distribution of the flowing stream are common. Hydrocarbon oils which are suitable for gas scrubbing are cracked at temperatures above about 800° F. with the formation of solid carbonaceous deposits. Gases at temperatures of 800° F. or above may not be contacted with scrubbing oil without danger of formation of solid carbonaceous deposits even though the bulk temperature of the oil in the scrubbing system is kept below 450° F. since localized high temperatures may be encountered.

In accordance with the process of this invention, a scrubbing liquid comprising liquid hydrocarbon and water is employed. This scrubbing liquid embodies the characteristics of an oil in possessing relatively high carbon carrying capacity and the water content protects the oil by preventing cracking due to localized high temperatures.

The relative amount of oil and water employed may vary within the range of about 10 to 90 volume percent water. At least 10 percent water in the scrubbing mixture is preferred to effectively protect the oil component from cracking. Oil contents of at least 50 volume percent are preferred to impart high carbon carrying capacity to the scrubbing liquid mixture. The oil and water are maintained in the form of an intimate mixture, a dispersion, or an emulsion by agitation. Effective mixing or agitation is readily obtained by pumping a stream of the scrubbing liquid from the bottom to the top of the scrubbing tower. Intense agitation is produced within the scrubbing tower by the countercurrent flow of gas and liquid. As the scrubbing liquid is circulated through the tower, the entrained substances separated from the gas being treated become suspended in the scrubbing liquid. The allowable carbon content of the scrubbing liquid is maintained below about 15 percent of the oil content of the scrubbing mixture by continuously withdrawing carbon loaded scrubbing liquid and adding fresh oil and water. The oil-water scrubbing liquid is circulated through heat exchange equipment to maintain its temperature within the range of about 150 to 450° F.

Advantageously the carbon loaded scrubbing liquid is passed to the partial oxidation zone whereby the carbon and oil comprise at least a part of the carbonaceous fuel charged to the generator and the water component of the scrubbing mixture supplies at least a part of the process water charged to the generator. This method of operation effectively utilizes the carbonaceous solids separated from the product gas for the production of additional carbon monoxide and hydrogen. Heat is efficiently utilized since the heat absorbed in the scrubbing zone is transferred in the scrubbing liquid to the gas generation zone. The scrubbing liquid comprises a premixed stream of liquid hydrocarbon oil and process water which insures uniform distribution of these components in the feed mixture introduced into the gas generator.

Advantageously, hydrocarbon liquid is cracked to produce gaseous products in admixture with the hydrogen and carbon monoxide partial oxidation products by introducing the liquid hydrocarbon directly into the hot gaseous effluent from the gas generator. At the resulting high temperature of the mixture, the hydrocarbon is rapidly cracked producing substantial quantities of normally gaseous hydrocarbons together with normally liquid hydrocarbons, tars and carbonaceous solids. Heretofore, considerable difficulty has been encountered due to the deposition of solid coke, and the condensation of tarry liquids on the surfaces of vessels and lines down-stream of the oil and hot gas contacting zone. These difficulties may be avoided by rapidly cooling the hot products from the cracking zone to a temperature below the boiling point of water at the prevailing pressure by quenching with a liquid mixture of hydrocarbon oil and water. Cooling effects condensation of normally liquid hydrocarbons and tars in the presence of a large mass of liquid. Condensed liquids, entrained tars and carbonaceous solid are effectively removed from the gaseous products by contact with the aforesaid liquid mixture of hydrocarbon and water in a scrubbing zone. Advantageously the total requirement of carbonaceous fuel is introduced as the oil feed into the gas generator effluent and passes to the gas generator after condensation and use as part of the scrubbing liquid in the quench-scrubber. Likewise the entire water requirements of the gas generator may be supplied initially to the quench scrubber to serve as a part of the quench scrubbing liquid therein.

An advantage of the process of this invention is that cracking is limited to a small zone which may be maintained free of obstructing deposits. The cracking zone may comprise a short section of pipe or a cylindrical reaction zone opening directly into the quench-scrubbing zone thereby avoiding the condensation of tar or liquids in the cracking zone and formation of solid deposits. Cracking in the quench-scrubbing zone is effectively arrested by the presence of liquid water. Local overheating of the scrubbing liquid is avoided since the large heat of vaporization of water prevents the occurrence of large temperature differentials. The liquid hydrocarbon serves to remove entrained solids from the product gases forming a suspension of solids in liquid. Relatively high concentrations of carbonaceous solid may be suspended in liquid hydrocarbons as compared with water without the formation of unpumpable mixtures. Both the liquid hydrocarbon feed and reactor water are used to suspend the carbon in the stream passed to the gas generation zone.

The accompanying drawing diagrammatically illustrates one form of the process of this invention. Although the drawing illustrates one arrangement of apparatus in which the process of this invention may be practiced it is not intended to limit the invention to the particular apparatus or materials described.

Oxygen in line 10 is heated to a temperature of about 400° F. in heater 11. Preheated oxygen in line 12 is passed to the burner 13 of gas generator 14. Carbonaceous fuel comprising liquid hydrocarbon, recycled carbonaceous solids, and water in line 20 are heated in heater 21 to a temperature of about 800° F. forming a dispersion of solid and oil particles in oil vapor and steam. The preheated fuel-steam dispersion in line 22 is passed to burner 13 and reacted with oxygen in gas generator 14 to produce a gas mixture comprising carbon monoxide and hydrogen. Gas generator products at a temperature, for example, of about 2600° F., issuing from generator 14 through line 23 are contacted in cracking zone 27 with an oil feed introduced through line 25. Water may be introduced through line 26 into admixture with the oil in line 25 to assist in dispersion of the oil in cracking zone 27 to assist in control of reaction temperature and to forestall the formation of carbonaceous deposits in cracking zone 27. Advantageously, the oil in line 25 may be emulsified with the water in line 26 by passing the mixture through a mixing valve, orifice plate, or other mixing means not shown. Cracking zone 27 may comprise a transfer line cracking zone or a cylindrical reaction zone free of obstructions discharging directly through line 28 into quench-scrubber 29. Cracking is effected in zone 27 preferably at a temperature within the range of about 1000 to 2000° F.

In quench-scrubber 29, the products issuing from line 28 are immediately cooled to a temperature below the boiling point of water at the prevailing pressure. In this method of quenching, an excess of liquid is provided effecting saturation of the gases with vapor, that is the vapor and liquid are brought to equilibrium. Upon further cooling of the saturated gases, the entrained particles serve as nuclei for condensation, condensate forms on the surface of the particles, and the resulting droplets are readily scrubbed from the gas. As the gaseous products rise through quench-scrubber 29 they are contacted in countercurrent flow with scrubbing liquid comprising an emulsion of liquid hydrocarbon, water and separated carbonaceous solids. Tars, entrained condensate and solids are effectively removed from the gaseous products and become mixed with or suspended in the scrubbing liquid. Liquid collecting in the bottom of quench-scrubber 29 is withdrawn through line 35 and passed by pump 36 through line 37 to heat exchanger 38. Cooled liquid in line 39 is introduced at the top of quench-scrubber 29. Make-up oil for quench-scrubber 29 may be introduced into line 39 from line 40. A portion of the circulating stream of scrubbing liquid may be passed to a stripping zone, not shown, where dissolved gases, for example, hydrogen sulfide, carbonyl sulfide and carbon dioxide, are released. In this manner, the scrubbing zone may be employed to effect purification of the gas stream as well as removal of carbon. Stripping may be effected merely by release of pressure, by use of a supplemental stripping gas, for example, steam or air, or by a combination of both pressure reduction and supplemental gas stripping.

A portion of the scrubbing liquid circulated from the bottom of the quench-scrubber through lines 35 is withdrawn through line 41 and passed to line 20 to comprise carbonaceous fuel and water passed to gas generator 14. Additional oil may be introduced into line 20 from line 42. A portion of the scrubbing liquid may be passed from line 41 through line 43 to cracking zone 27 to effect conversion of this stream by cracking.

Cooled and scrubbed gases from quench-scrubber 29 pass directly into the bottom of guard scrubber 45 where they are contacted in countercurrent flow with water introduced through line 46 to remove any entrained liquid, particularly liquid hydrocarbon, which may have been carried out of quench-scrubber 29. Water collecting in a trap tray 47 at the bottom of guard scrubber 45 is withdrawn through line 48 and recycled by pump 49 through line 50 to supply additional liquid loading to guard scrubber 45. Water overflowing from trap tray 47 falls into quench scrubber 29 carrying with it separated entrained liquid hydrocarbon.

Product gas comprising carbon monoxide, hydrogen and normally gaseous cracked products are discharged through line 55 for use not shown.

In accordance with the process of this invention, a heating gas is produced by the partial oxidation and cracking of a reduced crude oil. Tests on the reduced crude oil employed as feed stock are as follows.

| | |
|---|---|
| Gravity, ° API | 14.2 |
| Carbon residue, weight percent | 10.7 |
| Flash point, ° F | 365 |
| Pour point, ° F | 95 |
| Ultimate analysis, weight percent: | |
| Hydrogen | 11.0 |
| Carbon | 85.2 |
| Nitrogen | 0.41 |
| Oxygen (by difference) | 0.77 |
| Sulfur | 2.57 |
| Ash | 0.05 |

Reduced crude at a rate of 2000 pounds per hour is admixed with a stream of scrubbing liquid comprising 2406 pounds of scrubber oil and suspended carbonaceous solids and 1600 pounds of water. The combined stream is heated to a temperature of 800° F. and discharged as an oil-steam dispersion at a pressure of 425 pounds per square inch gauge to a partial oxidation gas generator. Oxygen of 99 percent purity is heated to 400° F. and is introduced to the gas generator with the oil-steam dispersion at a rate of 10,930 standard (measured at 60° F.

and one atmosphere pressure) cubic feet per hour. The oil, steam and oxygen react in the gas generator at an autogenous temperature of about 2600° F. The hot gas generator effluent is contacted with an additional 3000 pounds per hour of reduced crude effecting cooling of the gas and heating of the oil to a temperature of about 1900° F. The combined stream passes through a transfer line cracking zone wherein a portion of the injected oil is cracked to normally gaseous hydrocarbons which enrich the partial oxidation effluent gases. The transfer line cracking zone discharges directly into a quench zone of a scrubbing tower. The temperature of the quench zone is maintained at 400° F. by recycling a portion of the scrubbing liquid, a mixture of oil, water and separated carbonaceous solids, from the bottom of the scrubbing tower through heat exchangers and back to the top of the scrubbing zone. Water is added at the top of the scrubbing zone at a rate of 800 pounds per hour. Gas from the top of the scrubbing tower at a temperature of about 100° F. is caustic scrubbed to produce a purified product gas. Product gas is discharged at a rate of 22,000 standard cubic feet per hour. The product gas has a higher heating value of 367 B.t.u. per cubic foot, a sulfur content of 0.2 grain per hundred and the following composition (mol percent):

| | |
|---|---|
| Hydrogen | 44.7 |
| Carbon monoxide | 51.7 |
| Illuminants | 3.1 |
| Nitrogen and other | .4 |

Obviously, many modifications and variations of the invention, as hereinbefore set forth, may be made without departing from the spirit and scope thereof, and therefore only such limitations should be imposed as are indicated in the appended claims.

We claim:

1. In a process for the generation of gaseous mixtures of carbon monoxide and hydrogen wherein a carbonaceous fuel and process water are reacted with an oxygen containing gas in a gas generation zone at an autogenous temperature within the range of about 1800 to 3500° F. producing a hot gas comprising carbon monoxide, hydrogen and entrained carbonaceous solids, the improvement which comprises countercurrently contacting said hot gas with a scrubbing liquid in a contacting zone at a temperature below the boiling point of water under the pressure existing in said contacting zone, said scrubbing liquid comprising a liquid hydrocarbon oil and water wherein said water comprises a proportion within the range of about 10 to 50 volume percent of said scrubbing liquid effecting cooling of said gas and transfer of said carbonaceous solid from said gas into said scrubbing liquid forming a suspension of carbonaceous solid in a liquid mixture of oil and water, and passing at least a portion of said suspension to said gas generation zone as a combined stream of carbonaceous fuel and process water.

2. The process of claim 1 wherein said gas comprising carbon monoxide and hydrogen is generated and contacted with said scrubbing liquid at a pressure within the range of about 100 to 600 pounds per square inch gauge.

3. The process of claim 1 wherein said hot gas is contacted with said scrubbing liquid at a temperature within the range of about 150 to 450° F.

4. A process according to claim 1 wherein said hot gas from said gas generation zone is contacted with hydrocarbon oil under cracking conditions prior to contact of said scrubbing liquid.

5. A process according to claim 1 wherein hot gas from said gas generation zone is quenched and scrubbed in a first scrubbing zone with said scrubbing liquid, scrubbed gas from said first scrubbing zone is passed to a second scrubbing zone into contact with water effecting removal of entrained scrubbing liquid from said first scrubbing zone, and water and removed scrubbing liquid from said second scrubbing zone are passed to said first scrubbing zone.

References Cited in the file of this patent
UNITED STATES PATENTS

| | | |
|---|---|---|
| 1,959,945 | Bowman | May 22, 1934 |
| 2,394,849 | Doumani et al. | Feb. 12, 1946 |
| 2,404,071 | Jahnig | July 16, 1946 |
| 2,721,888 | Harris | Oct. 25, 1955 |
| 2,781,246 | Goldtrap | Feb. 12, 1957 |
| 2,781,299 | De Rosset | Feb. 12, 1957 |
| 2,793,938 | Frank | May 28, 1957 |
| 2,867,508 | Wood et al. | Jan. 6, 1959 |
| 2,882,138 | Pettyjohn et al. | May 27, 1959 |